June 22, 1943.    F. W. RIDDINGTON ET AL    2,322,593
PRESSING IRON
Filed June 9, 1942

Inventors:
Frederick W. Riddington,
Frank E. Finlayson,
by Harry E. Dunham
Their Attorney.

Patented June 22, 1943

2,322,593

UNITED STATES PATENT OFFICE 2,322,593

PRESSING IRON

Frederick W. Riddington and Frank E. Finlayson, Ontario, Calif., assignors to General Electric Company, a corporation of New York Application June 9, 1942, Serial No. 446,328

6 Claims. (Cl. 38—77)

This invention relates to pressing irons, more particularly to a pressing iron which may be used as a steam iron, and it has for its object the provision of an improved device of this character.

More specifically, this invention relates to steam irons provided with a water reservoir from which water is fed into a suitable steam generating chamber which transforms the water into steam, and delivers it through the sole plate for contact with the fabrics being ironed. And it contemplates the provision of improved means for controlling the flow of water from the reservoir to the steam generating chamber and also for filling the reservoir with water. In addition, it contemplates the provision of means preventing the accidental discharge of water from the reservoir to the exterior of the iron from the filling means; and further, the provision of improved vent means for the reservoir for venting it of any steam that might be formed therein, the vent means being constructed and arranged to prevent steam and any entrained hot water discharging from the reservoir from contacting the hand of the operator.

Figure 1:
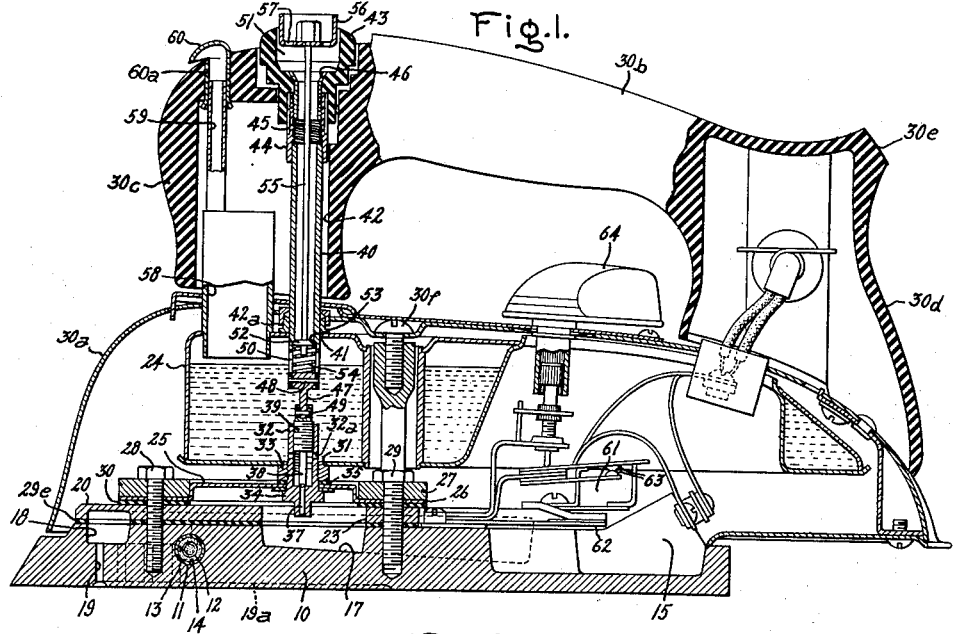
Figure 2:
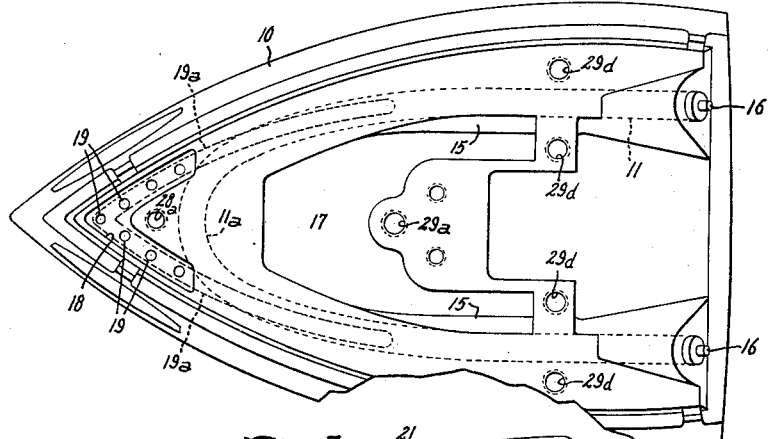

For a more complete understanding of this invention, reference should be had to the accompanying drawing in which Fig. 1 is a central, longitudinal, vertical, sectional view taken through an electrically heated pressing iron embodying this invention; Fig. 2 is a plan view of a portion of the pressing iron shown in Fig. 1; and Fig. 3 is a bottom plan view of a portion of the pressing iron of Figs. 1 and 2.

Referring to the drawing, this invention has been shown in one form as applied to an electrically heated pressing iron comprising a sole plate 10. The sole plate 10 is heated by an electrical heating element 11 which preferably is of the sheathed type. Briefly, it comprises a helical resistance conductor 12 mounted in an outer metallic sheath 13 and supported in spaced relation with reference to the sheath by an electrically insulating, heat conducting mass 14, formed of a suitable material, such as highly compressed granular magnesium oxide. The heating element 11 is roughly in the shape of a hair-pin, as shown in Fig. 2, with the extremities of its legs located at the rear of the iron and its nexus 11a located at the forward or pointed end of the iron. The U-shaped heating element 11 is embedded in the sole plate 10, the sole plate preferably being provided with an upright rib 15 of generally U-shape in which the heating element is received. As shown, the heating element is provided with suitable terminals 16 projecting from the ends of the sheath.

Formed within the sole plate 10 between the legs of the heating element 11 is a suitable steam generating chamber or cavity 17. The walls defining this chamber are highly heated by means of the heat conducted to them from the heating element 11 so that any water entering the chamber is flashed immediately into steam. At the forward end of the sole plate 10 there is a steam discharge chamber 18 which is connected with the pressing surface of the sole plate by means of a series of vertically positioned ducts or ports 19. These ports discharge into recesses 19a formed in the pressing surface of the sole plate.

Figure 3:
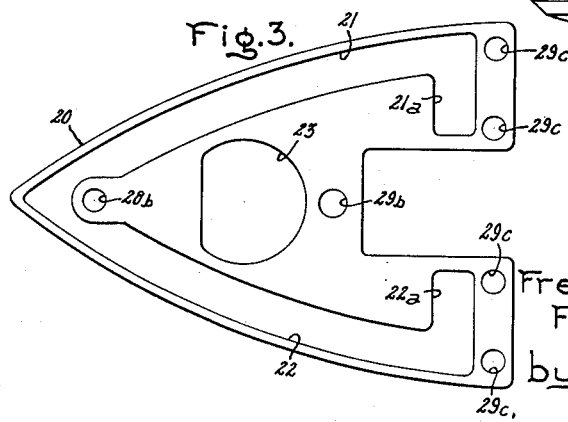

The steam generating chamber 17 and the steam discharge chamber 18 are provided with a common cover member 20, the bottom plan view of which is shown in Fig. 3. When this cover plate is mounted upon the sole plate, as shown in Fig. 1, it covers the major portion of the steam generating chamber 17, and also covers the steam discharge chamber 18. In the bottom surface of this cover plate are formed a pair of recesses 21 and 22 located at the sides of the cover and joining each other at the front, as clearly shown in Fig. 3. At their rear, the passageways 21 and 22 are provided with inwardly extending recesses 21a and 22a, respectively. When the cover plate is mounted upon the iron, as shown in Fig. 1, the two side recesses 21 and 22 are located directly above the rib 15 in which the heating element 11 is mounted and are closed at the bottom by this rib. The forward ends of these two recesses and the point where they join open directly into the steam discharge chamber 18. The two side recesses 21 and 22 are connected with the steam generating chamber 17 by means of their lateral extensions 21a and 22a which when the cover plate is mounted on the iron, as shown in Fig. 1, extend over the steam generating chamber. Thus, when steam is generated in the chamber 17, it flows upwardly into the extensions 21a and 22a, and thence flows through the two passageways 21 and 22 to their forward end where it discharges into the steam discharge member 18, and from this chamber 18 flows through the ports 19 directly to the pressing surface of the sole plate.

The cover plate 20 is further provided with an opening 23 through which water is fed into the steam generating chamber 17 from a suitable reservoir 24 mounted above the sole plate, as clearly shown in Fig. 1. The opening 23 is covered by means of an inverted cup-shaped closure plate 25, which cover plate also functions to mount the reservoir 24. The closure plate 25 is provided with an outwardly extending flange 26 above which is mounted a clamping ring 27. The clamping ring 27 and the cover plate 25 are rigidly secured to the sole plate by means of a pair of screw-fastening members 28 and 29 which are threaded into tapped holes 28a and 29a (Fig. 2) provided for them in the sole plate. Preferably, a suitable gasket 30 will be interposed between the cover plate 25 and the sole plate closure plate 20. The screw-fastening means 28 and 29 also function to clamp the forward end of the sole plate cover plate 20 to the sole plate, the plate 20 being provided with apertures 28b and 29b through which the two screw-fastening means respectively are directed. The cover plate 20 at the rear is secured by means of four screws inserted through openings 29c provided for them in the cover plate and received in tapped holes 29d provided for them in the sole plate. Preferably, a suitable gasket 29e, having a shape corresponding to the lower wall surfaces of plate 20 that contact the sole plate, will be inserted between the plate 20 and the sole plate.

The water reservoir 24 extends from a point adjacent the forward end of the iron rearwardly thereof so as to overhang the rear edge of the sole plate, as shown in Fig. 1. The reservoir is covered by a shell 30a upon which is mounted a handle 30b. This handle, as shown, is provided with forward and rear standards 30c and 30d which are secured in any suitable manner to the top wall of the shell 30a. The rear handle standard 30d is provided at its upper end with a protuberance 39e which cooperates with the rear edge of the shell 30a to support the iron on its heel in an upright position of rest. The shell is secured to the sole plate by means of a screw 30f threaded into the screw member 29, as shown.

The reservoir is provided in its bottom wall with an opening 31 through which extends a suitable water discharge control member 32. Below the opening 31 is a suitable bushing 33 rigidly secured to the bottom wall of the reservoir and receiving the control member 32 in threaded engagement, as shown. The member 32 is provided with a shoulder 34 which when the member 32 is threaded up in the bushing 33 rigidly clamps the member 32 and the reservoir to the cover 25. Preferably, a gasket 35 will be interposed between the lower end of the bushing 33 and the upper surface of the cover plate 25.

The member 32 is provided with a water discharge passageway 37 opening into the steam generating chamber 17, as shown. The discharge of water through this passageway is controlled by means of a needle valve 38. The needle valve 38 is provided with an enlarged threaded section 39 which is threaded into the member 32. The member 32, as shown, is provided with openings 32a below the enlarged section 39 and through which water may flow from the reservoir past the needle valve 38 and through the passageway 37 when the needle valve is open.

The position of the needle valve 38 is controlled by means of a tubular member 40 extending upwardly through the reservoir, through an opening 41 provided in its top wall and through the forward standard 30c of the handle 30b, this standard being provided with an enlarged cavity or chamber 42 for accommodating the tubular member. A suitable packing or stuffing box 42a is provided to seal the reservoir opening 41.

At its upper end the tubular member has secured thereto an operating knob 43. This knob is secured to the upper end of the tubular member 40 by means of another tubular member 44 which has its lower end rigidly secured to the tubular member 40. The knob 43 is directly secured to the member 44 by means of a key 45 and by means of a tubular screw member 46. The knob 43, as shown, extends upwardly so that it may be grasped and turned by the attendant to control the position of the needle valve between its opened and closed positions.

The lower end of the tubular member 40 is connected to the enlarged section 39 of the needle valve 38 by means of a universal connection comprising a link 47 secured to the lower end of the tube 40 by means of a pin 48 and to the upper end of the enlarged section 39 by means of a pin 49. The pins 48 and 49 are made to fit tightly in the link 47, but the holes in the tubular member 40 and in the enlarged section 39 are relatively large, as shown, so that some relative motion between the tubular member 40 and the enlarged section 39 is possible. This universal connection is provided to allow for considerable misalignment between the tubular member 40 and the enlarged section 39 and associated valve parts.

The tube 40 functions not only as a means for operating the needle valve 38, but it also operates as a duct for supplying water to the reservoir 24. For this purpose, the lower end of the tube is provided with openings 50 discharging into the reservoir 24, and the control knob 43 is provided with a centrally arranged chamber 51 through which water is introduced into the tubular member.

The tubular member 40 is provided with a valve 52 above the discharge openings 50 which is arranged to move to a closed position against a seat 53 to prevent water from the reservoir accidentally flowing back into the tube 40, and hence, out of the iron, which condition is most likely to happen when the iron is on its heel in its upright position of rest. The valve 52 is biased to its closed position by means of a compression spring 54. It is opened by means of a rod 55 connected to the valve and extending upwardly through the tubular member 40. The rod when depressed will open the valve 52 to permit water introduced into the tube to flow into the reservoir. This rod 55 at its upper end is provided with a cup-shaped operating member 56 which when depressed, of course, depresses the rod and hence opens the valve. The cup-shaped member 56 also acts as a fill funnel for the tube 40. For this purpose it is provided with water discharge openings 57 in its bottom wall so that water introduced into the cup will flow down through the operating knob 53, the tubular screw 46, the tube 40 and thence into the reservoir, providing of course the valve 52 is open.

One convenient way of filling the reservoir is to place the water in a pitcher, place the mouth of the pitcher in the cup 56, depress the cup by the mouth and hence open the valve 52, and then tilt the pitcher to pour its contents through the cup and the tube 40 into the reservoir. When the pitcher is raised the valve 52 will be automatically shut by means of the spring 54 in order to prevent water flowing from the reservoir back into the fill tube.

The reservoir, as shown, is spaced thermally from the sole plate so that relatively little heat is conducted to it. However, in order to prevent any possible generation of steam pressure in the reservoir it is vented through a steam dome 58 which rises from the forward end of the reservoir, as shown, and from which in turn rises a vent tube 59. The steam dome and the tube 59 pass upwardly through the chamber 42 provided in the forward standard 30c of the handle, and the top end of the vent tube 59 discharges through the handle. Positioned above the discharge opening of the vent tube 59 is a deflector 60 which is constructed and arranged to deflect any steam or entrained water issuing from the vent forwardly of the iron away from the hand of the operator. As shown, this deflector is mounted upon and secured to a tube 60a which in turn is directed through and supported on the handle.

It is to be noted that the provision of the dome 58 performs an important function. If the vent tube 59 extended on downwardly into the reservoir, instead of being connected to the receiver through the dome 58, as shown, it is possible that objectionable amounts of water would be discharged through the vent tube. This would be likely because when the iron is being operated water would splash into the tube, tend to close it; and the drops of water in the tube, therefore, would be forced upwardly through the vent tube by the generation of vapor pressure in the reservoir. The steam dome, however, because of its large diameter cannot be closed by drops of water which are splashed into it; on the contrary, as soon as the water in the reservoir falls away from the dome any water drops which may be splashed up into the dome during the ironing operation will drop away from it at once; in other words, the dome will clear itself of water.

Another important function of the vent arrangement is that it allows air to go in and out of the reservoir as the tank empties and fills. In other words, it prevents the formation of an airlock.

The energization of the heating element 11 is controlled by means of a thermostatically operated switch 61 which preferably will be of the type described and claimed in the copending application of Harold R. Batchelor, Serial No. 354,380, filed August 27, 1940, and which is assigned to the same assignee as this invention. Briefly, this switch comprises the bimetal temperature responsive element 62 which operates switch contacts 63 connected in the energizing circuit of the iron. The temperature setting of the thermostatic switch is controlled by means of a knob 64 positioned above the shell 30a, as shown.

While we have shown a particular embodiment of our invention, it will be understood, of course, that we do not wish to be limited thereto since many modifications may be made, and we, therefore, contemplate by the appended claims to cover any such modifications as fall within the true spirit and scope of our invention.

What we claim as new and desire to secure by Letters Patent of the United States is:

1. A steam iron comprising a water reservoir, a steam generating chamber, means for heating said chamber, a valve controlling the flow of water from said reservoir to said steam generating chamber, a tubular member connected to said valve constituting an operating member therefor, and also constituting a supply duct having an opening leading into said reservoir through which water is fed into said reservoir, a second valve for closing said opening to prevent the flow of water into and through said tubular member to the exterior of said iron, and means forcibly biasing the latter valve to its closed position in all positions of said iron.

2. A steam iron comprising a water reservoir, a steam generating chamber, means for heating said chamber to generate steam from water supplied to it from said reservoir, an adjustable valve controlling the flow of water from said reservoir to said steam generating chamber, a tubular member connected to said valve constituting an adjusting member therefor, and also constituting a supply duct having an opening leading into said reservoir through which water is fed to said reservoir, a valve for closing said opening biased to a closed position to prevent the flow of water from said reservoir back into said duct, and an operating member for the latter valve extending through said tubular member to the exterior of said iron whereby it is accessible for operation to control the position of said valve.

3. A steam iron comprising a water reservoir, a steam generating chamber under said reservoir, means for heating said chamber to generate steam from water supplied to it from said reservoir, a valve controlling the flow of water from said reservoir to said steam generating chamber, a tubular member extending up through said reservoir connected to said valve constituting an operating member therefor and also a supply duct having an opening leading to said reservoir through which water is fed to said reservoir, an operating member for said tubular member connected to its upper end and provided with a recess therein, a second valve located in said tubular member arranged when in a first position to close said opening to prevent the flow of water from said reservoir back into said tubular member and when in a second position to open said opening, a spring in said tubular member biasing said second valve to said first position, a rod connected to said second valve extending upwardly through said tubular member, and cup shaped cap attached to the upper end of said rod located in said recess in said operating member and constructed and arranged to open said second valve when it is depressed, and also to function as a fill funnel for said tubular member.

4. In a steam iron, a water reservoir, a steam generating chamber located under said water reservoir, means for heating said chamber to generate steam from the water fed into it from said reservoir, a needle valve in the lower part of said reservoir controlling the flow of water therefrom into said steam generating chamber, a tubular member extending upwardly from said reservoir having an opening in communication with said reservoir and through which water is fed to the reservoir, a universal joint driving connection between said tubular member and said needle valve for opening and closing said needle valve responsively to the turning of said tubular member, an operating knob for said tubular member provided with a centrally-arranged chamber therein, a second valve located in said tubular member arranged when shut to close said opening to prevent the flow of water from said reservoir back into said tubular member, a spring biasing said second valve to its closed position, a rod connected to said second valve extending upwardly through said tubular member, a cup-shaped fill member attached to the upper end of said rod and received in said chamber in said operating knob functioning when depressed to open said second valve against the force of said biasing spring and when released permitting said second valve to be closed by said spring, and said fill cup having openings in its bottom wall through which water introduced into said cup may flow into said tube.

5. A steam iron comprising a shell, a handle attached to said shell, a water reservoir housed within said shell, a steam generating chamber under said shell for generating steam from the water fed into it from said reservoir, a steam dome rising from the forward end of said reservoir having a cross-section so large that drops of water splashed on the walls thereof during the ironing operation will not be retained by said walls but will drop therefrom back into the reservoir, a vent tube of relatively small cross section rising upwardly from said steam dome and extending upwardly through an opening provided for it in the forward end of said handle, and a deflector covering the discharge opening of said vent tube constructed and arranged to prevent steam or water issuing from said opening from contacting the hand of the operator when grasping said handle.

6. A steam iron comprising a sole plate, a shell housing said sole plate, a handle attached to said shell, a water reservoir housed within said shell over said sole plate, a steam generating chamber within said shell under said reservoir for generating steam from the water fed into it from said reservoir, means for heating said generating chamber, a steam dome and vent tube connected with it rising from said reservoir and passing through said shell, said vent tube having a cross-section relatively small as compared with that of said dome, and said vent tube discharging away from said handle, the cross-section of said steam dome being so large that drops of water splashed on the walls thereof during the ironing operation will not be retained by said walls but will drop therefrom back into said reservoir, whereby water can not be forced into said vent tube and out of it by vapor pressure in said reservoir that is generated by the heat within said shell.

FREDERICK W. RIDDINGTON.
FRANK E. FINLAYSON.